(12) United States Patent
Weschke (10) Patent No.: US 10,001,803 B2
(45) Date of Patent: Jun. 19, 2018

(54) ROTATION DETECTION DEVICE AND A VEHICLE PEDAL COMPRISING SUCH A DEVICE

(71) Applicant: Carl Johan Walter Weschke, Dalsjöfors (SE)

(72) Inventor: Carl Johan Walter Weschke, Dalsjöfors (SE)

( * ) Notice: Subject to any disclaimer, the term of this patent is extended or adjusted under 35 U.S.C. 154(b) by 0 days. days.

(21) Appl. No.: 14/722,350

(22) Filed: May 27, 2015

(65) Prior Publication Data

US 2015/0253803 A1 Sep. 10, 2015

Related U.S. Application Data

(63) Continuation of application No. PCT/SE2013/051412, filed on Nov. 29, 2013.

(51) Int. Cl.
| | |
|---|---|
| G05G 1/30 | (2008.04) |
| G05G 1/38 | (2008.04) |
| B60T 7/04 | (2006.01) |
| G01D 5/14 | (2006.01) |
| G05G 1/44 | (2008.04) |

(52) U.S. Cl.
CPC .............. *G05G 1/38* (2013.01); *B60T 7/042* (2013.01); *G01D 5/145* (2013.01); *G05G 1/44* (2013.01); *Y10T 74/2054* (2015.01)

(58) Field of Classification Search
CPC . G05G 1/38; G05G 1/44; B60T 7/042; G01D 5/145
See application file for complete search history.

(56) References Cited

U.S. PATENT DOCUMENTS

| | | | | |
|---|---|---|---|---|
| 6,426,619 B1* | 7/2002 | Pfaffenberger | ....... | F02D 11/106 324/207.2 |
| 6,515,473 B2* | 2/2003 | Pfaffenberger | ....... | F02D 11/106 324/207.2 |
| 7,710,108 B2* | 5/2010 | Keller | ................. | G01D 11/245 123/399 |
| 7,816,913 B2 | 10/2010 | Inuzuka | | |
| 8,240,230 B2* | 8/2012 | Peniston | .............. | B60K 26/021 324/207.12 |
| 2005/0247158 A1* | 11/2005 | Willemsen | ............... | G05G 1/38 74/513 |
| 2005/0268741 A1* | 12/2005 | Wilczek | ............... | F02D 11/106 74/513 |
| 2006/0117902 A1* | 6/2006 | Martin | .................... | G05G 1/38 74/512 |
| 2011/0115480 A1* | 5/2011 | Babin | ................... | G01D 5/145 324/207.25 |

* cited by examiner

*Primary Examiner* — Vicky A Johnson
(74) *Attorney, Agent, or Firm* — Gabriela B. Tomescu, Esq.; Bergenstrahle & Partners AB (57) ABSTRACT

A rotation detection device for detection of rotation of a vehicle pedal (2) around an axis of rotation, comprising a movable first part, which accompanies the rotational motion of the pedal, a stationary second part, a magnetic field sensing component arranged in the first or in the second part and a magnetic element arranged in that part of the first or the second part that does not comprise the magnetic field sensing component when the first and the second part are moving in relation to each other. The first part comprises a base part and at least one arm protruding from the base part, where at least one arm at least partly surrounds the second part.

13 Claims, 5 Drawing Sheets

ROTATION DETECTION DEVICE AND A VEHICLE PEDAL COMPRISING SUCH A DEVICE

TECHNICAL FIELD

The present invention relates to a rotation detection device for the detection of rotation of a vehicle pedal and a vehicle pedal comprising such a device.

BACKGROUND

It is previously known to measure a position of a vehicle pedal by detection of a rotation around a vehicle pedal shaft. The rotation can be detected by moving a magnetic element over a magnetic field sensing component/sensor, such as a Hall element.

Previously known commercial solutions have placed the centre of the magnet field sensing component in the centre of rotation of the shaft in order to reduce the wear of the parts and to increase the accuracy. Such a placement is however space requiring in an axial direction, which is a disadvantage since there is often a lack of space around the pedal gear in a vehicle.

However, there also exist prior art that solve this problem and place the sensor outside of the axis of rotation of the pedal.

Such a prior art solution is for example described in EP1801542A2, which discloses a pedal with a sensor device for detection of an angle of rotation around a shaft. The sensor device comprises a magnetic element, which is mounted at a rotatable arm which is mounted around the axis of rotation of the pedal and a stator with a magnetic field sensing sensor. The sensor generates a signal originating from magnetic interaction between the movable magnetic element and the sensor which is statically mounted.

A further solution is disclosed in U.S. Pat. No. 7,816,913B2. This document describes a pedal with a sensor device for detection of an angle of rotation of the pedal. The sensor device comprises a movable part comprising magnets, said part being mounted at the pedal, and a stationary part which comprises a magnetic field sensing component. The sensor device is arranged radially outside of the axis of rotation of the pedal and generates a signal originating from magnetic interaction between the static and the movable part.

Previously known systems use strong and expensive magnets and are difficult to control in axial direction. In order to be able to maintain the accuracy of readings also after a time of use and wear, the distance between sensor and magnet has to be controlled.

The construction described in the present application offers a solution to the above discussed problems.

In connection with prior art solutions also the calibration of the detection device has been problematic. The present construction solves also these problems.

SUMMARY OF THE INVENTION

The object of the present invention is to provide a rotation detection device for a vehicle pedal, which is space-saving, has a high accuracy, few and simple components, and which is easy to assemble and to calibrate, both at assembly and after-check.

Accordingly, the invention relates to a rotation detection device for detection of rotation of a vehicle pedal around an axis of rotation comprising a movable first part, which accompanies the rotational motion of the pedal, a stationary second part, wherein the first and the second part are arranged radially outside of the axis of rotation of the pedal and having a contact surface common to each other. The device also comprises a magnetic field sensing component and a magnetic element. The magnetic field sensing component is arranged in the first or in the second part and the magnetic element is arranged in that part of the first or the second part where the magnetic field sensing component is not arranged, whereby the magnetic field sensing component generates an electric signal originating from magnetic interaction between the first and the second part when the contact surfaces of the first and the second part are moving in relation to each other. The invention is characterized in that the first part is coupled to the second part so that the motion of the first part in relation to the second part is controlled.

With the above construction the motion of the magnet is controlled so that it cannot move in a radial direction in relation to the magnetic field sensing component. This results in a more reliable measurement result and a better accuracy. The magnetic field sensing component can for example be of a Hall or Reed type, which detects the magnetic field depending on where the magnetic element is in relation to the magnetic field sensing component. The physical design of the rotation detection device solves the problems with not enough space, which most often are prevalent when embedding sensors for pedals in cars. It is no longer necessary to physically have the centre of the rotation detection device over the center of the axis of rotation but instead the device can easily be mounted in one of the sides/brackets of the pedal gear, which then also can act as a shield for the rotation detection device.

In one embodiment the first part comprises a base part and at least one arm protruding from the base part and arranged in such a way that said at least one arm at least partly surrounds the second part.

When at least one arm of the first part surrounds the second part a guide of the two parts in relation to each other is created in a radial direction. If only one arm is used it might e.g. be placed at the part of the first part which faces away from the axis of rotation of the pedal. It is also possible to use two arms; one on each side of the second part, which creates an enclosure of the second part in both the radial axes extending from the axis of rotation.

In one embodiment at least one protrusion is arranged at the arms of the first part, which extends in a substantially perpendicular direction from the arms towards the second part and which is intended to cooperate with a first guide groove arranged in the second part.

Thus, the second part slides in a groove in the first part, which is linked to the stationary chassis. Thereby, the motion of the first part is guided so that it is kept at a constant distance also in an axial direction in relation to the second part. Due to the fact that the magnetic element sits on a part separate from the pedal and that it is guided in the axial direction, the magnet will be able to have the same distance to the magnetic field sensing component in the axial direction even if there is a small play in the pedal in the axial direction. This results in that it is possible to keep down the distance between the magnet and the magnetic field sensing components while at the same time both axial and radial tolerances can be absorbed and a physical centre is not needed. The design also does that the first part can absorb tolerances of surrounding components in x/y/z-directions through a calibration procedure and also by the design of the interacting components.

In one embodiment the protrusion of the first element is comprised of at least three protruding legs which run separately in the first guide groove.

By having at least three protruding legs sliding in the guide groove the problem with the first part getting jammed, so called drawer effect, is solved. The contact surfaces are kept at a minimum in order to minimize friction and thereby any noise problems.

In one embodiment the protrusion of the first part is resilient in radial and/or axial direction.

When the legs are resilient the pedal position sensor manage a certain amount of dirt and foreign particles in the grooves without experiencing any significant degeneration of the quality of the signal.

In one embodiment the magnetic element is arranged in the first part and the magnetic field sensing detector is arranged in the second part.

The magnetic element/the magnet is thus fastened in a part that accompanies the rotational motion of the pedal but which is separate from the pedal.

In one embodiment the first part is embedded in a self-lubricating material.

If a self-lubricating material is used, it is not necessary to use lubricating grease or similar lubricant substance in order to reduce the friction between the parts.

In one embodiment the first part is, through a link, coupled with the axis of rotation of the pedal, and the second part is mounted in a bracket which is fastened in the chassis of the vehicle.

The first part might have the centre of rotation in the same centre of rotation as the pedal, i.e. centered in the axis of rotation, or in a separate centre of rotation. The design also makes it easy to fasten the first part in the pedal gear without extra fastening elements by using the already existing hub locking.

In one embodiment the second part is intended to be movably arranged in relation to an adjustment bracket, arranged to partly surround the second part, which is mounted in a bracket which is fastened in a the chassis of the vehicle. Thereby an adjustment of the position of the rotation detection device in relation to the chassis of the vehicle is made possible.

Thereby a sliding between the adjustment bracket and the second part and an adjustment of the position of the complete rotation detection device in relation to the chassis of the vehicle is allowed, which facilitate mounting and calibration of the rotation detection device.

In one embodiment the second part comprises a second guide groove, which allows a sliding between adjusting bracket and the second part.

The guide groove controls the motion in axial direction between adjustment bracket and the second part.

In one embodiment the friction in the first guide groove between the first and the second part is lower than the friction in the second guide groove between the second part and the adjustment bracket.

In one embodiment the first and the second part are lockable in relation to each other with a pin, which is arranged to run in holes provided in the first and the second part.

Since the friction is different between the different guide grooves and the respective part that slides in the groove, the motion can be controlled so that when the first and the second part are locked in relation to each other with the pin, the sliding motion takes place between the bracket and the second part and when the pin is removed the sliding motion takes place between the first and the second part.

In one embodiment the first part is coupled with the shaft of the pedal through a groove arranged directly in the pedal, in a component welded onto the pedal or as an external part which is fastened on the hub of the pedal.

The invention also relates to a vehicle pedal characterized in that it comprises a pedal shaft, a pedal part which is rotatable around an axis of rotation which extends through the centre of the pedal shaft and a rotation detection device according to any of the embodiments above intended to detect an angle of rotation of the pedal part.

All the above embodiments or parts of an embodiment can be combined freely as long as the combination is not contradictory.

SHORT DESCRIPTION OF THE DRAWINGS

The invention will now be described with reference to the accompanying drawings showing illustrative embodiments of the invention. In the drawings.

DESCRIPTION OF EMBODIMENTS

A detailed description of embodiments of the invention will follow. All examples shall be regarded as parts of the general description and are therefore in general possible to combine.

Figure 1:
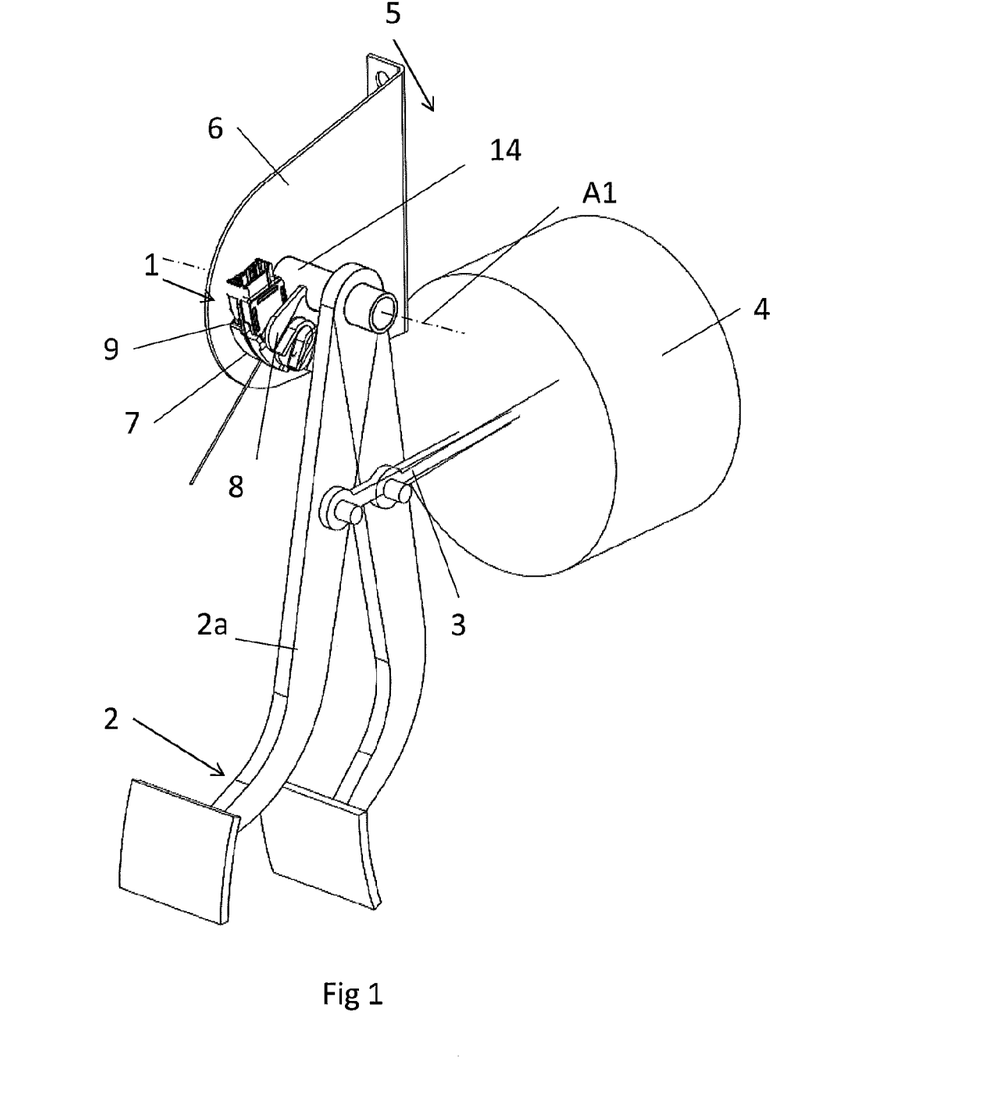
FIG. 1 shows the rotation detection device according to the invention mounted at a vehicle pedal.

FIG. 1 shows the rotation detection device 1 according to the invention mounted at a pedal gear 2. The vehicle pedal 2 can for example be a brake, throttle or clutch pedal, which through a link 3 is coupled to a means 4 intended to transform pedal motion to a force transmitting medium, for example hydraulic fluid. The vehicle pedal 2 is fastened in the chassis 5 of the vehicle through a bracket 6 or similar fastening means. Preferably a further bracket is arranged in parallel with the first bracket, wherein the other end of the pedal shaft is mounted, however this bracket is removed from the Figure in order to illustrate the invention more clearly. The vehicle pedal 2 comprises a pedal shaft 14 and a pedal part 2a which is rotatable around an axis of rotation A1, which extends through the centre of the pedal shaft 14. The chassis 5 and the mounting bracket 6 are here said to be stationary, but of course is this in relation to the other stationary vehicle components and not in relation to the surroundings, if the vehicle itself moves.

The rotation detection device 1 comprises a first movable part 7 which is directly, or through a link 8, coupled with the pedal shaft 14 and which accompanies the rotational motion of the pedal part 2a, and a stationary second part 9, which is fastened in the chassis 5 through the bracket 6. The first and the second part 7, 9 are arranged radially outside the axis of rotation A1 of the pedal. The first part 7 is coupled to the second part 9 so that the motion of the first part 7 is controlled in radial direction in relation to the second part 9.

Figure 2A:
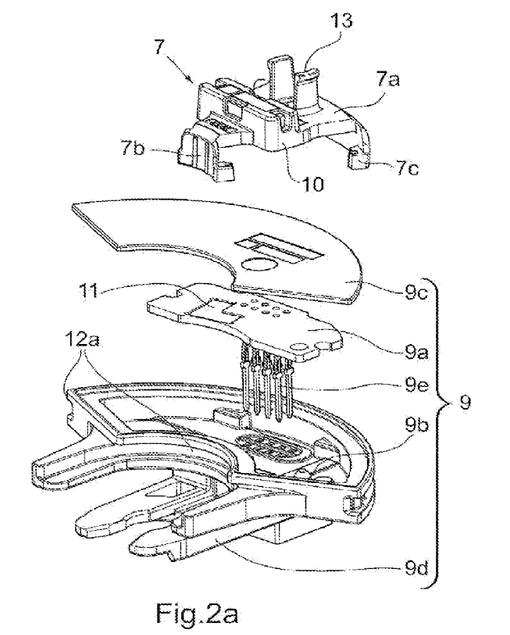
FIGS. 2a, 2b and 2c show a first and a second embodiment of the rotation detection device.

FIG. 2a shows a detailed view of a first embodiment of the rotation detection device. In the figure the first part 7 comprises a magnetic element/magnet 10 (see also FIG. 3)

and the second part 9 comprises a magnetic field sensing component 11 or sensor of Hall or Reed type. The sensor 11 detects the magnetic field depending on where the magnetic element is in relation to the magnetic field sensing component. Depending on the different magnetic field sensing components different signals result, corresponding to a certain rotation of the vehicle pedal. The signals can be partly digital (on/off) or linear over the motion. Of course, the magnet 10 can be placed in the second part 9 and then the magnetic field sensing component 11 in the first part 7.

The second part 9 comprises a printed circuit card 9a, in which the magnetic field sensing component 11 is placed, and a sensor housing 9b. The sensor housing 9b is preferably designed as a disk or as part of a circle which has an extension in a direction along the circumference of the pedal shaft. The device can deliver one or several types of position signals depending on the design of the printed circuit card. The signals can be of either digital or analogous character or a combination if desired. In order to protect the printed circuit card 9a and the sensor 11 a cover 9c is provided on top of the printed circuit card. At least on the outside, but also on the inside of the sensor housing 9b, i.e. on the radially transverse surfaces on the housing in relation to the axis of rotation 14 of the pedal, at least a first guide groove 12a is arranged. The second part 9 comprises also a fastening part 9d, which is intended to be fastened in the pedal gear 6 in different ways, which is described more in detail in the FIGS. 4-6. In the sensor housing 9b guide pins and protruding contact pins are also arranged, which are intended to be fastened in the printed circuit card 9a and to lead the signals from the magnetic field sensing component 11 to the unit which analyzes the signal.

The first part 7 comprises a base part 7a and at least one arm 7b that protrudes from the base part. In FIG. 2a the first part is shown having two arms 7b. The arms 7b are arranged so that they at least partly surround the second part 9, when the first and the second part are assembled together. On the arms 7b is arranged at least one protrusion 7c, which extends in a substantially perpendicular direction from the arms 7b towards the second part 9. The protrusion 7c is intended to slide in and cooperate with the first guide groove 12a arranged in the second part 9 and at assembly the first part 7 is fitted into the guide groove 12a of the second part 9. At the base part 7a is also provided a fastening part 13 which protrudes from the first part 7 in a direction which is substantially parallel with the pedal shaft 14. The fastening part 13 is intended to be fastened in the rotating shaft 14 of the pedal, either directly or through the link 8 which might be integrated with or fastened in some other way in the pedal 2. For example the first part 7 may be coupled with the pedal shaft 14 of the pedal through a groove arranged directly in the pedal, in a component 8 welded onto the pedal or as an external part which is fastened on the hub of the pedal. The embodiment shown in FIG. 2a, where the second part 9 is directly fastened in the stationary chassis 5, for example through a bracket 6, is suitable when the output signal has a linear character. An electronic zero point calibration is then made by using an adaptive algorithm stored either in a processor on the printed circuit card 9c or one of the processors of the car might be used in those cases where this is suitable. The pedal position sensor 1 learns its zero point by reading its own output signal and storing it when certain criteria are fulfilled, when it is certain that the driver has not the foot on the pedal. Examples of criteria can be that the output signal of the pedal position sensor lies within an acceptable range for what can be expected while at the same time the signal is steady enough, i.e. it is not probable that a man influences it with its foot and if one then reads the smallest value during the sampling time, one might be quite sure of that a true zero value has been accomplished. The pedal position sensor 1 thus calibrates itself electronically. This calibration can be done in the desired way during the lifetime of the car, at the factory, during service and automatically over time. It is also possible to get a switch (on/off) signal calibrated in this way, but still a signal which is linear over the range is necessary.

Figure 2B:
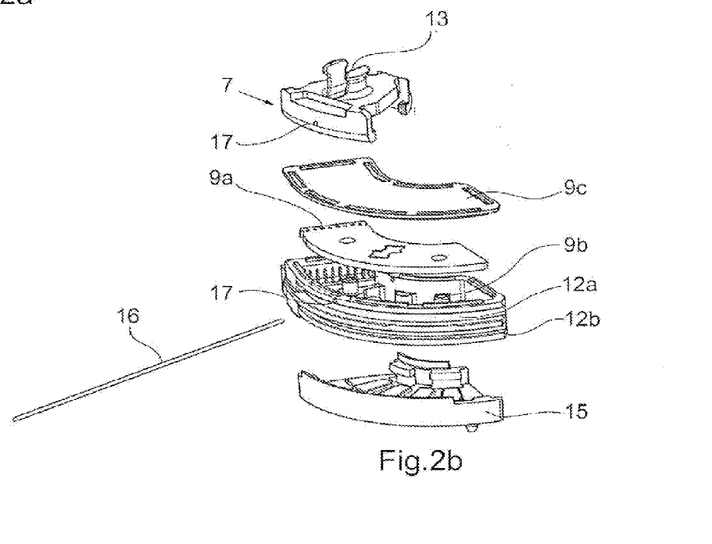

FIG. 2b shows a detailed view of a second embodiment of the rotation detection device 1. In the Figure the first part 7 comprises a magnetic element/magnet 10 and the second part 9 a magnetic field sensing component 11 or sensor. The second part 9 comprises a printed circuit card 9a, in which the magnetic field sensing component 11 is placed and a sensor housing 9b and a cover 9d arranged on top of the printed circuit card. On the outside of the sensor housing 9b, on its radially transverse surfaces in relation to the axis of rotation 14 of the pedal, a first and a second guide groove 12a, 12b are arranged. The first part 7 comprises also here a base part 7a and two arms 7b protruding from the base part with protrusions 7c intended to slide in and cooperate with the first guide groove 12a. The fastening part 13 is intended to be fastened in the rotating shaft 14 of the pedal directly or through the link 8, which can be integrated with or fastened in any other way in the pedal shaft 14.

Figure 2C:
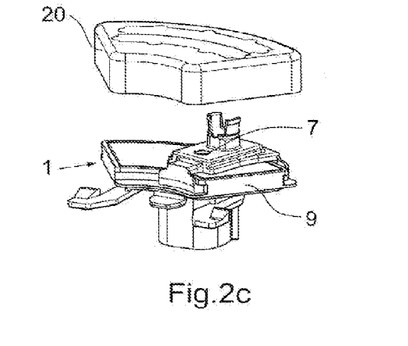
Figure 2D:
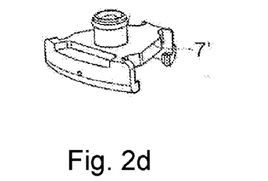
FIG. 2d shows an alternate fastening part.

In FIGS. 2b and 2d, two different embodiments of the first part, 7 and 7', are shown, the differences being the design of the fastening part 13. In FIG. 2b, the embodiment shows a fastening part 13 with a cast O-ring, and in FIG. 2d the embodiment shows a separate O-ring. Both O-ring constructions attend to that the pedal 2 engages and attaches to the fastening part 13 and makes it possible to take up tolerances.

The difference between this embodiment of FIG. 2b and the previous one shown in FIG. 2a is that the second part 9 is movably arranged in relation to an adjustment bracket 15, arranged partly surrounding the second part 9 and in that it is the adjustment bracket 15 which is mounted in the bracket 6, which is fastened in the chassis 5. The sensor housing 9b of the second part 9 comprising a second guide groove 12b, in which the adjustment bracket 15 slides. Thereby a sliding is allowed between adjustment bracket 15 and the second part 9 and an adjustment of the position of the complete rotation detection device 1 in relation to the chassis 5 of the vehicle, which facilitates mounting and calibration of the rotation detection device. This embodiment shows also a pin 16 for locking of the first part 7 together with the second part 9. The pin 16 extends through a hole 17 in the first part 7 and through a hole 17 in the sensor housing 9b of the second part 9. The grooves 12a and 12b and the sliding surfaces in the protrusions 7c of the first part and the sliding surface of the adjustment bracket are so designed that the coupled first and second parts get a higher frictional resistance in the groove 12a than the frictional resistance that arises in the second groove 12b, when the adjustment bracket 15 moves in relation to the backside of the second part.

When mounting the rotation detection device in the vehicle the parts that are locket together (pin 16, first part 7 and second part 9), as long as the pedal is moved, run in the adjustment bracket 15 until the pedal 2 is joined with the device 4, which is intended to transform pedal motion to a power transmitting medium. In that way there is a possibility of mechanical calibration after the mounting of the pedal position sensor 1 in a car and the pedal is coupled with the motion transforming device 4, for example brake booster or clutch cylinder. When the pedal is held together with the motion transforming device 4 the installer removes the pin 16 which releases the first part 7. As long as the pin 16 sits in place the second part 9 and the first part 7 will be stuck in relation to each other and they will move in relation to the pedal 2 in the adjustment bracket 15. When the pin 16 is removed the first part 7 will move with the pedal 2 in relation to the second part 9, since the friction force is much smaller between the first part 7 and the second part 9 than between the second part 9 and the adjustment bracket 15.

This embodiment is especially suitable in those cases where the components of the rotation detection device 1 are of switch type (on/off) and the demand of accuracy is so high that one cannot do without calibration. Determination of the reversal point is done by positioning the components on the printed circuit card 9a in relation to the embedded magnet 10.

Accordingly, there are two ways of calibrating the rotation detection device. For old vehicles, where the electrical system is frozen, a device is used according to embodiment one with an adjustment bracket 15. For new vehicles, where the electrical system is not frozen, or in those cases where one gets the opportunity to make changes therein or is allowed to build in intelligence in the rotation detection device, a self-learning algorithm can be used, which during the lifetime of the car adjusts the electronic zero position of the pedal. Here one can choose to leave out adjusting board and pin. The rotation detection device 1 learns by itself when the pedal 2 is unaffected.

FIG. 2c shows a further embodiment of the rotation detection device 1. Here the complete device is enclosed in a housing 20. The housing 20 acts as a dust protector, or alternatively as an EMC protection, if it is lined on the inside with foil. It is also possible to dress the sensor housing 9b with foil on the inside or to manufacture the housing in a special plastic in order to increase the resistance to EMC disturbances.

Figure 3:
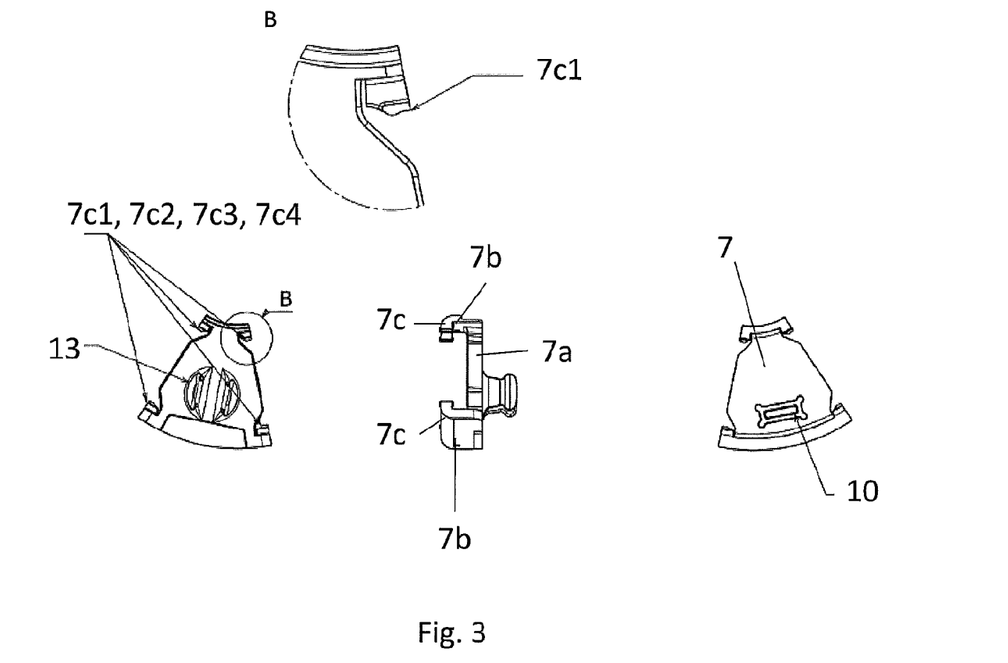
FIG. 3 shows the first part of the rotation detection device in different views.

In FIG. 3 the first part 7 is shown in different views. The protrusions 7c are here at least three (four are shown in the Figures) protruding legs 7c1, 7c2, 7c3, 7c3, running separately in the first guide groove 12. These protruding legs 7c1, 7c2, 7c3, 7c4 are resilient in radial and/or axial direction and are so designed that they will shovel all particles which these legs cannot spring away from, before themselves and in that way keep the sliding surface free from bigger disturbances in the form of foreign particles. Smaller particles are taken care of by the resilience, which is obtained through the design of one of the pair of legs of the first part 7. Particles which are not shoveled away are managed by the resilience of the legs without that the quality of signal will be significantly deteriorated.

Both the first and the second part 7, 9 can easily be injection-molded in plastic and with an automated assembly a cost can be achieved which corresponds to less than half of the cost for sensors of today. Here it is also advantageous to choose a plastic which protects the circuits from EMC-radiation. EMC-securing of the components of the second part, i.e. cover 9c and sensor housing 9b, will result in a well protected sensor. It also possible to embed the first part 7 by molding it into a self-lubricating material. The magnet 10 is also molded into the first part 7.

During the assembly of the rotation detection device the circuit card 9a is mounted down over guide pins molded in the sensor housing 9b and protruding contact pins 9e, which are joined with the circuit card 9a. When necessary a protective coating is applied on top of the circuit card 9a in order to protect the circuit card from short-circuiting because of condensation water or similar. Thereafter the cover is applied in order to further protect the circuit card 9a.

The cover 9c is fastened in the sensor housing 9b using laser welding, ultrasonic welding, melting, gluing or similar fastening process. Alternatively, the sensor housing 9b is filled up with a heat paste. The first part 7 is now fitted into the first guide groove 12a of the second part 9 and is pushed into position. The rotation detection device 1 is now programmed with its zero-points and if adjustment bracket 15 is used, the pin 16 is then mounted. The rotation detection device 1 is now complete and ready to be mounted in the pedal gear with its pedal bracket 6.

According to one embodiment e method for the manufacture of a rotation detection device intended for detection of rotation of a vehicle pedal 2 around an axis of rotation A1 is described. The rotation detection means may comprise a movable first part 7, which accompanies the rotation motion of the pedal 2 and comprises a magnetic element 10, and a second stationary part 9 comprising a magnetic field sensing component 11, wherein the first and the second part 7, 9 are intended to be arranged radially outside the axis of rotation A1 of the pedal, wherein the second part 9 comprises a circuit card 9a, a sensor housing 9b and a guide groove 12a, and on the first part 7 is arranged at least one protrusion 7c intended to cooperate with the guide groove 12a, arranged in the second part 9. This method comprises the following steps:

mounting of the circuit card 9a onto contact pins protruding from the sensor housing 9b;
joining of the contact pins with the circuit card 9a;
introducing of the protrusions 7c of the first part 7 into the guide groove 12a of the second part 9.

The method may also comprise any or some of the following steps: feeding and positioning of an adjustment bracket 15; feeding and assembling of the sensor housing 9b in the adjustment bracket 15; application of protecting lacquer on the circuit card 9a; putting on and fastening of cover 9c on the sensor housing 9b. thereafter the rotation detection device is programmed with its zero points. If adjustment bracket 15 is used the pin 16 is now mounted.

Figure 4:
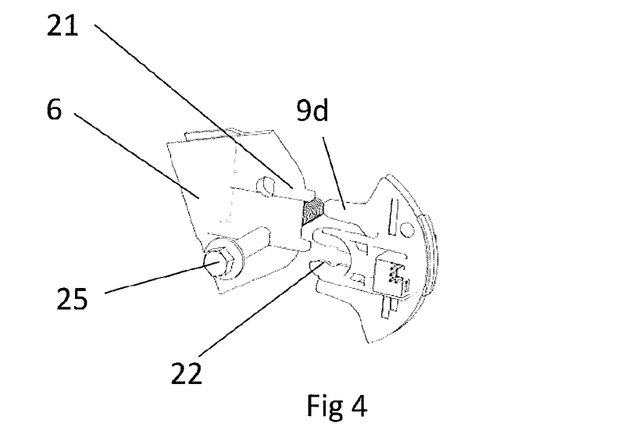
FIGS. 4, 5 and 6 show different solutions for the mounting of the rotation detection device in pedal gears of different materials.
Figure 5:
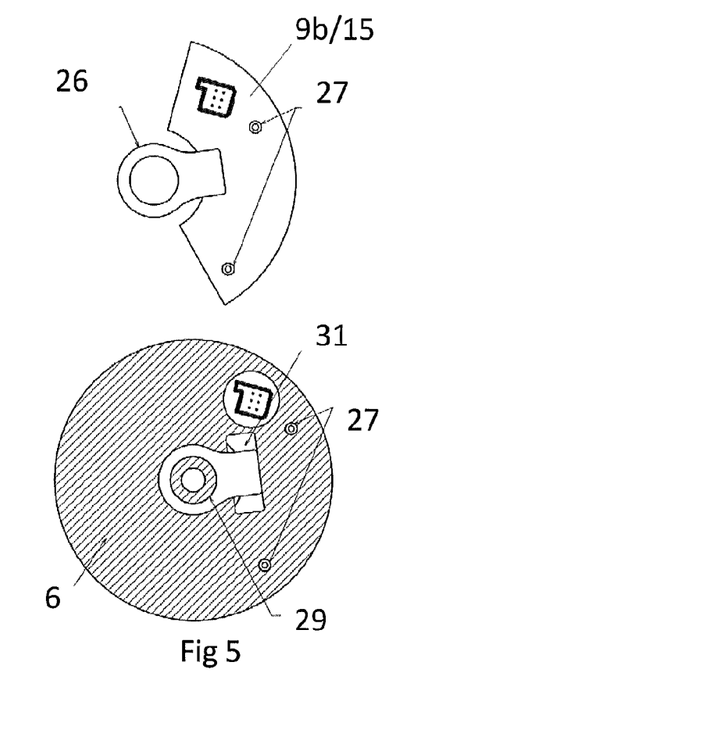
Figure 6:
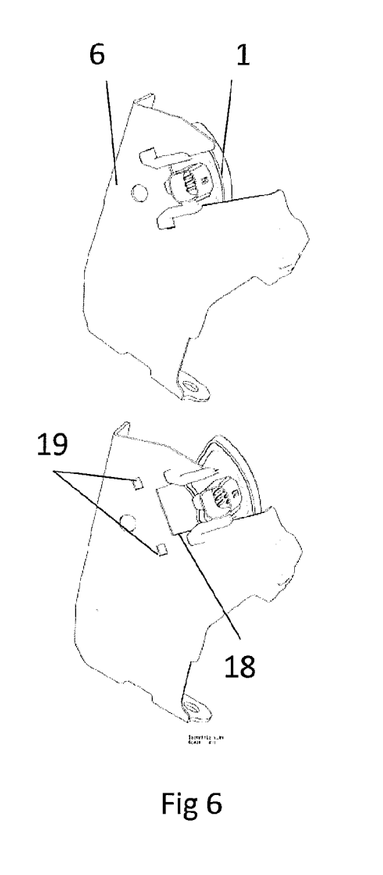

The rotation detection device 1 can, with different designs of sensor housing 9b or adjustment bracket 15 be optimized for fastening in pedal gears 6 made of different materials, fundamental examples are given in FIGS. 4, 5 and 6. The fastening of the rotation detection device 1 is thought to take place in different ways depending on if the pedal bracket 6 is made of plate or if it is molded in plastic, aluminum, magnesium, or other moldable material.

For molded pedal brackets the fastening part 9d of the adjustment bracket 15 or the sensor housing 9b and the interface of the pedal bracket 6 are formed in the way that is shown in FIG. 4 with molded edges 21 and snap fastener 22, respectively. The fastening part 9d of the sensor housing 9b steers against the molded edges 21 and the snap fastener 22 snaps around a bolt or other shaft 25 at the center of the pedal gear. The rotation detection device 1 is locked in position by the guides 21 and by the fact that a head/nut is tightened around the shaft 25 and squeezes it to be fixed. It is also possible to lock the device in position by using any other locking device, such as a pin or similar.

For pedal brackets made of plate 6 an arm with a hole 26 is molded in the adjustment bracket 15 alternatively in the sensor housing 9b, depending on if adjustment bracket 15 is used or not, in the way that is shown in FIG. 5. In the pedal bracket is formed a protrusion 29 and a hole 31 is cut for passing through of the arm of the pedal position sensor. The arm pedal position sensor is guided through the cut hole 31, around which the hole in the arm 26 is slipped. Molded guide pins 27 at the pedal sensor is placed in guide holes 30 in the bracket and thereafter a bolt- and nut-joint or other locking joint is tightened in the same way as for castings, FIG. 4. The nut or the collar of the bolt now locks the pedal sensor by the pressure from the bolted joint and the guide pins guarantee that the positioning will be exact enough. Only the active interface in the plate bracket 6 is defined in the drawing.

In FIG. 6 a further embodiment is shown, which advantageously can be used when the rotation detection device 1 is mounted on a steel or plate bracket 6. The steel bracket 6 has a groove 18 and at least two snap holes 19, which can be square. The rotation detection device 1 is introduced into the groove 18 and is snap fitted in the holes 19. The assembly process is very time and cost saving. Advantageously, the hole for the pedal shaft 14, the groove 18 and the snap holes 19 are cut/stamped out of the bracket 6 during one and the same manufacturing step. This makes it possible to have very close tolerances.

Figure 7A:
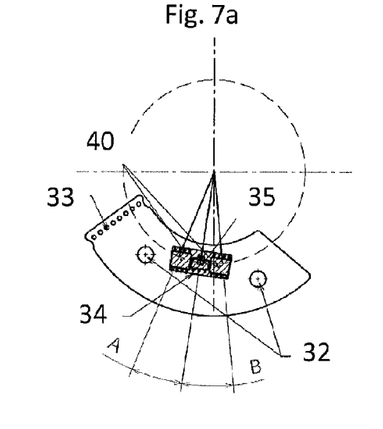
FIG. 7a-d show different types of printed circuit cards.

FIG. 7a shows a printed circuit card which with the same magnet generates two redundant linear signals 40 and a digital voltage signal 35 or further an analogous linear signal which is intended to be used as electronically calibrated switch signal. The magnet 34 is shown as the shaded area and examples of guide holes in the circuit card 32 are shown. The circuit card 32 rests against a step at the root of the pin. Examples of holes for connection with the contact pins 33 are also shown. The magnet is positioned in half the stroke, A:s left position shows the rest position of the pedal and B:s right side the maximum stroke.

Figure 7B:
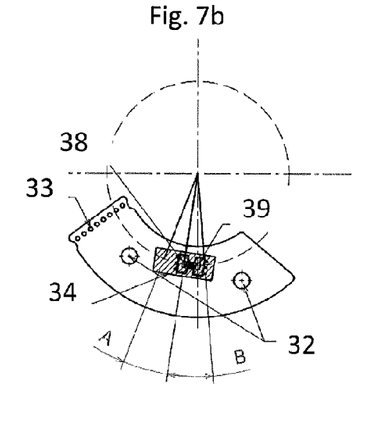

FIG. 7b shows a circuit card with an analogous voltage output signal 38 and a switch 39.

Figure 7C:
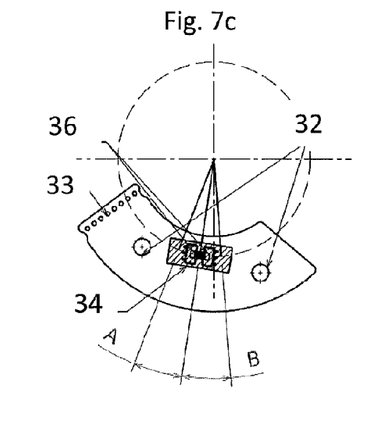

FIG. 7c shows how you get redundant analogous signals 36.

Figure 7D:
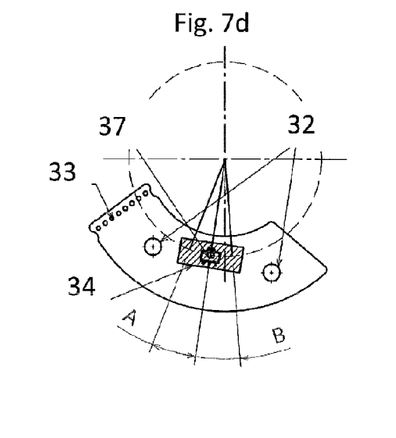

FIG. 7d shows how you get a single analogous signal 37 over the stroke alternatively one may here replace and position a switch of either Hall or Reed type.

All of these circuit cards can be activated with a magnet 34 of common strength and size, which considerably increase the competitiveness of the design. All embodiments can use the same components.

The invention claimed is:

1. A vehicle pedal, comprising a pedal shaft, a pedal part being rotatable around an axis of rotation which extends through a center of the pedal shaft and a rotation detection device for detection of rotation of the vehicle pedal around the axis of rotation, the rotation detection device comprising:
    a movable first part, which accompanies the rotational motion of the pedal,
    a stationary second part, wherein the first and the second part are arranged radially outside of the axis of rotation of the pedal and radially outside the pedal shaft,
    a magnetic field sensing component arranged in the first or in the second part and a magnetic element arranged in that part of the first or the second part that does not comprise the magnetic field sensing component, wherein the magnetic field sensing component generates an electric signal originating from magnetic interaction between the first and the second part when the first and the second part are moving in relation to each other, wherein the first part is coupled to the second part so that the motion of the first part is controlled in relation to the second part, and so that the magnetic element cannot move in a radial direction in relation to the magnetic field sensing component, wherein the first and the second part are coupled in such a way that the first part comprises a base part and at least one arm protruding from the base part and are arranged such that said at least one arm at least partly surrounds the second part, wherein at least one protrusion is arranged at said at least one arm of the first part, which is intended to cooperate with a first guide groove, arranged in the second part.

2. Vehicle pedal according to claim 1, wherein said at least one protrusion extends in a substantially perpendicular direction from said at least one arm towards the second part.

3. Vehicle pedal according to claim 1, wherein the protrusion of the first part is comprised of at least three separate protruding legs arranged to run in the first guide groove.

4. Vehicle pedal according to claim 1, wherein the protrusion of the first part is resilient in a radial and/or an axial direction.

5. Vehicle pedal according to claim 1, wherein the magnetic element is arranged in the first part and the magnetic field sensing component is arranged in the second part.

6. Vehicle pedal according to claim 1, wherein the first part is embedded in a self-lubricating material.

7. Vehicle pedal according to claim 1, wherein the first part, through a link, is linked to the pedal shaft of the pedal in which the axis of rotation is arranged and wherein the second part is mounted in a bracket which is mounted to the chassis of the vehicle.

8. Vehicle pedal according to claim 1, wherein the second part is intended to be movably arranged in relation to an adjusting bracket, which is arranged partly surrounding the second part, which is mounted in a bracket which is mounted in the chassis of the vehicle, enabling an adjustment of the position of the rotation detection device in relation to the chassis of the vehicle.

9. Vehicle pedal according to claim 8, wherein the second part comprises a second guide groove, which enables a sliding between the adjustment bracket and the second part.

10. Vehicle pedal according to claim 9, wherein friction between the first and the second part in the first guide groove is lower than the friction between the second part and the adjustment bracket in the second guide groove.

11. Vehicle pedal according to claim 8, wherein the first and the second part are lockable in relation to each other with a pin, which is arranged to run in holes arranged in the first and the second part.

12. Vehicle pedal according to claim 7, wherein the first part is linked to the pedal shaft of the pedal through a groove arranged directly in the pedal, in a component welded onto the pedal or as an external part, which is mounted onto the hub of the pedal.

13. Vehicle pedal according to claim 1, wherein the second part has a snap fastener for attachment to the pedal shaft of the pedal, so that the pedal and the rotation detection device obtain a common center of rotation.

* * * * *